United States Patent
Nakamura

(10) Patent No.: US 9,160,907 B2
(45) Date of Patent: Oct. 13, 2015

(54) TRACKING APPARATUS

(71) Applicant: KABUSHIKI KAISHA TOSHIBA, Minato-ku, Tokyo (JP)

(72) Inventor: Hiroaki Nakamura, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 488 days.

(21) Appl. No.: 13/707,641

(22) Filed: Dec. 7, 2012

(65) Prior Publication Data

US 2013/0250126 A1 Sep. 26, 2013

(30) Foreign Application Priority Data

Mar. 22, 2012 (JP) .................. 2012-066273

(51) Int. Cl.
| H04N 5/225 | (2006.01) |
| G02B 27/64 | (2006.01) |
| G02B 23/16 | (2006.01) |
| G01S 3/786 | (2006.01) |

(52) U.S. Cl.
CPC .............. H04N 5/2252 (2013.01); G02B 23/16 (2013.01); G02B 27/644 (2013.01); G01S 3/7864 (2013.01)

(58) Field of Classification Search
None
See application file for complete search history.

(56) References Cited

U.S. PATENT DOCUMENTS

| 8,098,893 | B2 | 1/2012 | Nakamura et al. | |
| 8,174,581 | B2 | 5/2012 | Nakamura | |
| 8,525,088 | B1* | 9/2013 | Ell et al. | ........................ 244/3.17 |
| 2006/0071134 | A1* | 4/2006 | Dent et al. | .................. 248/274.1 |
| 2006/0077255 | A1* | 4/2006 | Cheng | ............................ 348/143 |
| 2009/0207250 | A1* | 8/2009 | Bennett et al. | ................ 348/144 |
| 2010/0019120 | A1* | 1/2010 | Burnham et al. | ............. 248/550 |
| 2010/0157056 | A1* | 6/2010 | Zohar et al. | .................... 348/144 |
| 2012/0212622 | A1 | 8/2012 | Nakamura et al. | |
| 2013/0014584 | A1 | 1/2013 | Nakamura | |
| 2014/0251123 | A1* | 9/2014 | Venema | ....................... 89/41.22 |

FOREIGN PATENT DOCUMENTS

| JP | 2005-114035 A | 4/2005 |
| JP | 2006-106910 A | 4/2006 |
| JP | 2009-234524 A | 10/2009 |

OTHER PUBLICATIONS

Japanese First Office Action dated Feb. 17, 2015 from corresponding JP Application No. 2012-066273, 4 pages.

* cited by examiner

Primary Examiner — William C Vaughn, Jr.
Assistant Examiner — Michael J Hess
(74) Attorney, Agent, or Firm — Ohlandt, Greeley, Ruggiero & Perle, L.L.P.

(57) ABSTRACT

According to one embodiment, a tracking apparatus includes a spherical body, $1^{st}$ to $3^{rd}$ gimbals, a movable body, three or more spherical driving units, a hold unit, a target position identifying unit, $1^{st}$ to $4^{th}$ angle sensors, a rotation spring driving unit, a moving unit, a transmission unit, and a control unit. The rotation spring driving unit returns the third gimbal to a center of a rotation range of the third gimbal. The moving unit moves a movable lens to set a distance between a fixed lens and the movable lens. The control unit causes the spherical driving units to swing the movable body based on the position data and the $1^{st}$ to $4^{th}$ angles, reorients the movable body to point in a desired direction, and controls the distance.

8 Claims, 8 Drawing Sheets

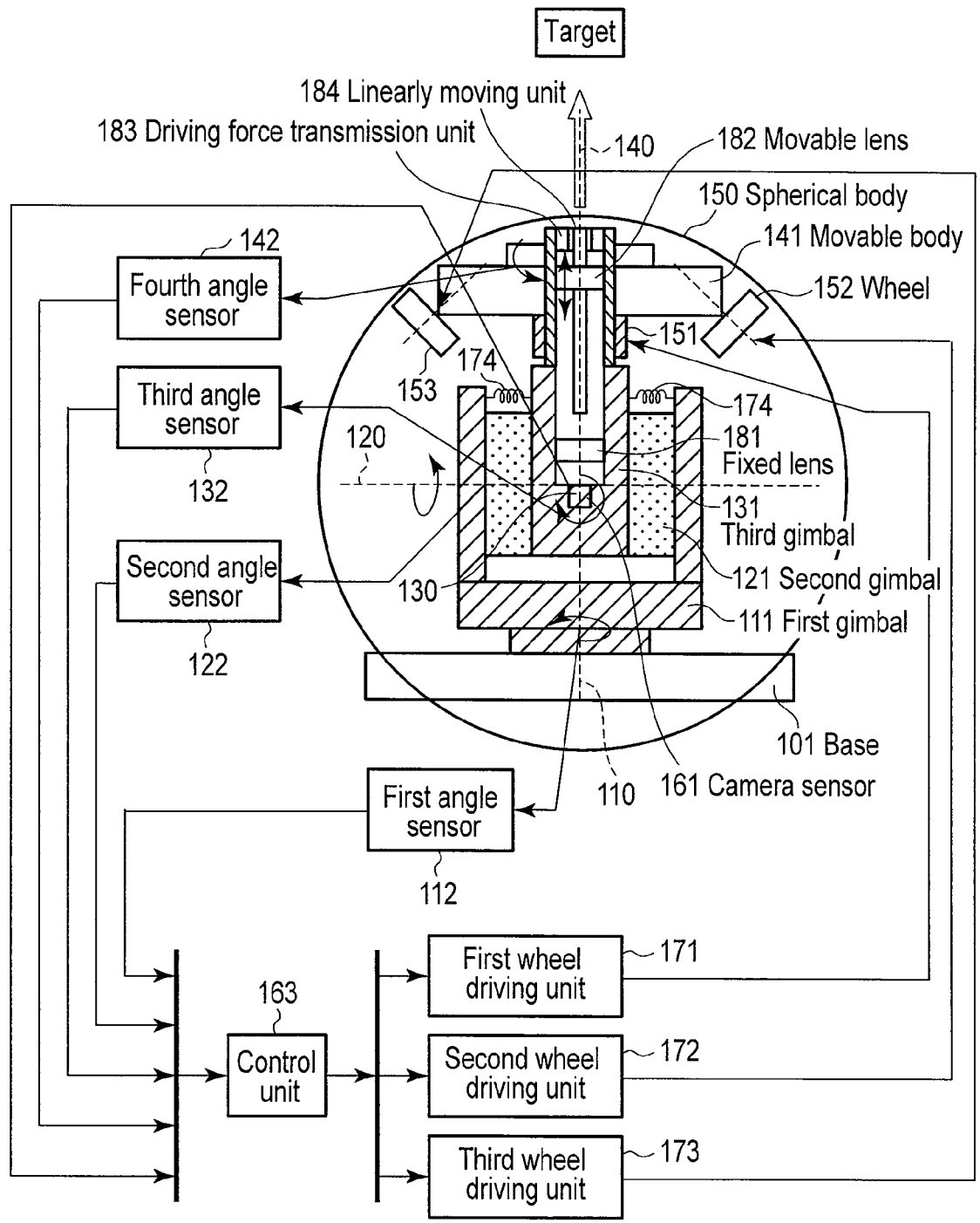
F I G. 1

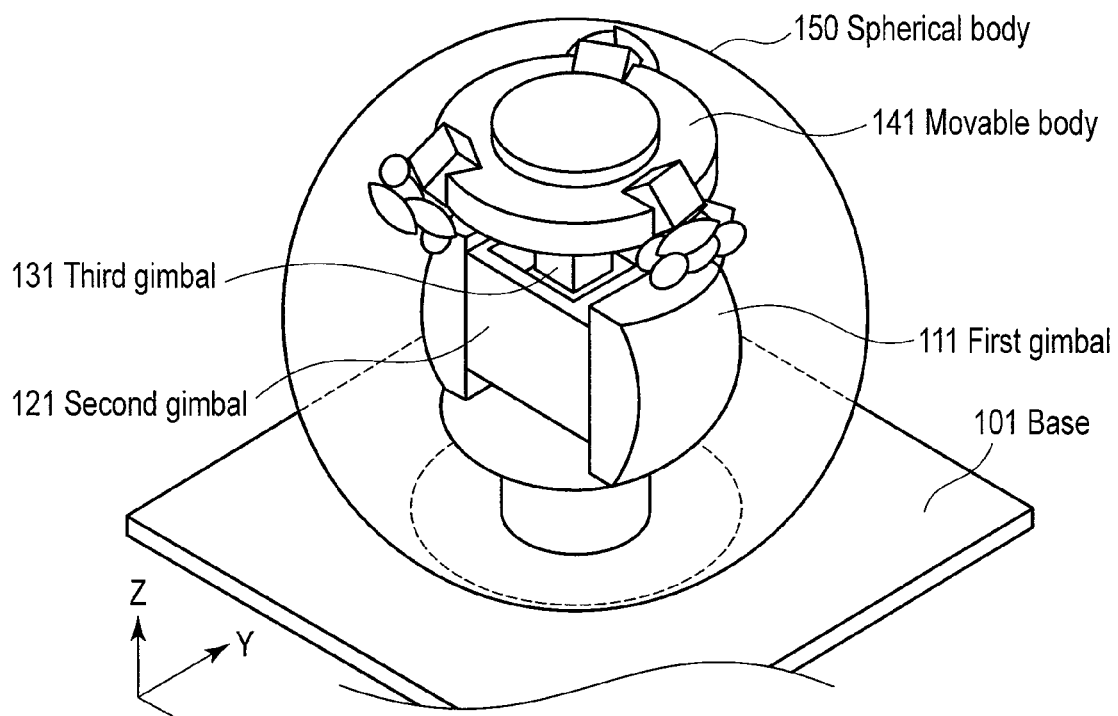
FIG. 2A
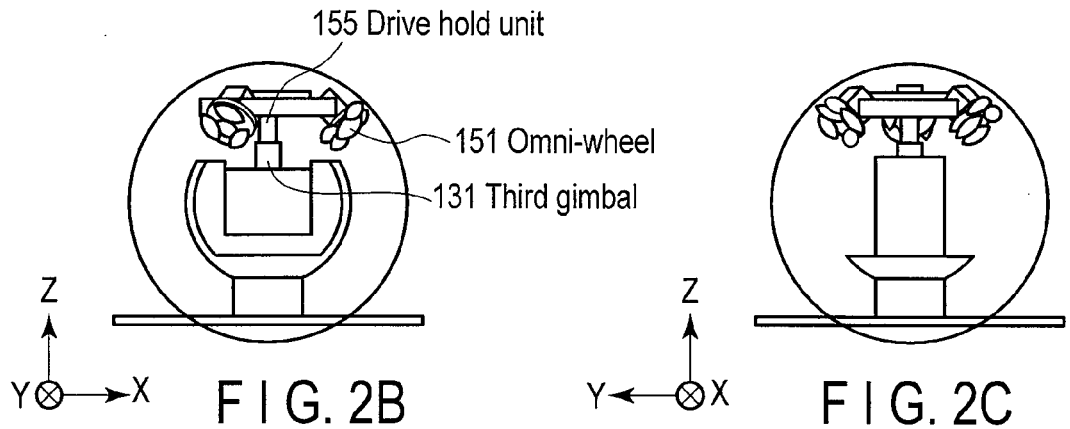
FIG. 2B
FIG. 2C
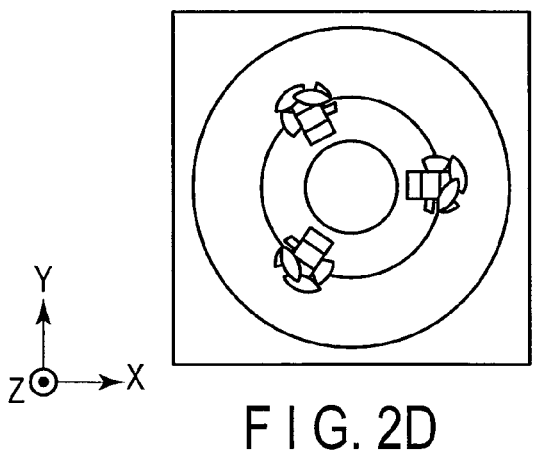
FIG. 2D

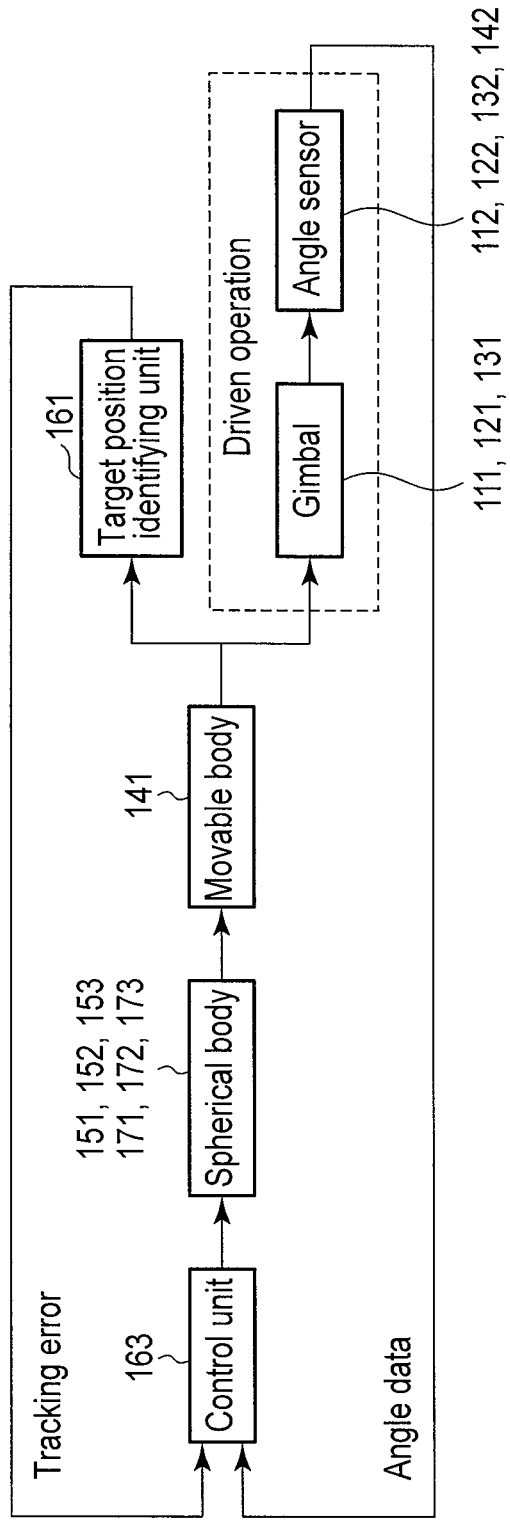
F I G. 9

TRACKING APPARATUS

CROSS-REFERENCE TO RELATED APPLICATIONS

This application is based upon and claims the benefit of priority from prior Japanese Patent Application No. 2012-066273, filed Mar. 22, 2012, the entire contents of which are incorporated herein by reference.

FIELD

Embodiments relate to tracking apparatuses enabling a target identifying sensor, such as a camera, to track a target that can move in every direction.

BACKGROUND

In recent years, systems for tracking an object using, for example, an Industrial television camera, to realize continued monitoring or acquire detailed information have been produced on a commercial basis for protective service equipment employed in large-scale facilities such as airports and manufacturing plants, lifeline facilities such as electric power plants and water networks, and traffic information support systems such as Intelligent Transport Systems. These systems include not only ground equipment type systems, but also compact ones installed in vehicles, ships or airplanes and having a vibration-proof structure. In the systems, it has come to be important to enhance their whirling speed to make them quickly point a plurality of targets and sequentially track the targets.

In such a conventional moving object image tracking system as the above, to track a target that moves in all directions, a gimbal structure is often employed. The gimbal structure needs to have at least two axes. In such biaxial gimbals, when a target passes the zenith or a position near the same, it is necessary to instantly rotate the AZ axis thereof through 180 degrees. Actually, however, this quick rotation is hard to execute since the motor torque is limited, and hence the phenomenon, called gimbal lock, which makes it impossible to continuously track an object will occur. Therefore, the biaxial gimbal structure cannot be oriented to the zenith and its vicinity, which makes it difficult to realize omnidirectional tracking.

In light of the above, in some conventional image tracking systems, a triaxial gimbal structure is employed to enhance the degree of freedom in tracking, and is attempted to be used to continuously track a target in all directions, with its azimuth axis (Az axis) and cross elevation axis (xEL axis) controlled so as not to excessively increase the angular velocity to thereby avoid gimbal lock and make the movement of the gimbal fall within an allowable range.

Further, as a conventional technique that does not employ a gimbal structure, a mechanism has been proposed in which a spherical casing is rotated in all directions by a friction rolling mechanism.

Yet further, as a mechanism for rotating a spherical movable body utilizing friction, a conveyor apparatus capable of moving by rolling a spherical rotary hollow body with its surface formed of an elastic member has been proposed.

The above conventional techniques have a problem that downsizing is hard to realize and a control law for tracking a target is complex. For instance, in the triaxial gimbal structure, the number of driving means, such as motors, is increased, which makes it difficult to reduce the size and manufacturing cost. Also, since a camera, for example, is installed, the inertia load of the xEL axis is inevitably increased, which may cause interference between the Az axis and the xEL axis. Thus, problems peculiar to the triaxial gimbal structure may well occur. In addition, although it is possible to reduce the angular velocity of the Az axis utilizing a redundant axis, the angular velocity required for the Az axis is still greater than that of any other axis, whereby the driving torque needed for the Az axis is inevitably increased.

Furthermore, a system utilizing no conventional gimbal structure is free from a problem such as gimbal lock. In this case, however, it is difficult to automate the system. For instance, it is necessary to drive a spherical body by artificial remote control until a target enters the screen of a camera. In addition to this, since there is no element for acquiring information indicating the orientation of the camera, it is difficult to automatically track the target using information acquired from an image thereof. Also, since the camera, for example, in the spherical casing is accessed by radio, the timing of moving the camera is limited.

Moreover, it is difficult to apply the conventional mechanism for driving a spherical body to a moving object image tracking system, although this mechanism is applicable to, for example, a moving apparatus. For instance, it is difficult to reorient the camera to point in a desired direction, because the spherical body is driven so that a table moves with its attitude kept horizontal.

BRIEF DESCRIPTION OF THE DRAWINGS

FIG. 1 is a block diagram illustrating a tracking apparatus according to embodiments;

FIG. 2A is a perspective view of the tracking apparatus shown in FIG. 1;

FIG. 2B is a front view of the tracking apparatus shown in FIG. 1;

FIG. 2C is a side view of the tracking apparatus shown in FIG. 1;

FIG. 2D is a top plan view of the tracking apparatus shown in FIG. 1;

FIG. 9 is a block diagram illustrating a control system for tracking the movement of a target;

DETAILED DESCRIPTION

Figure 3A:
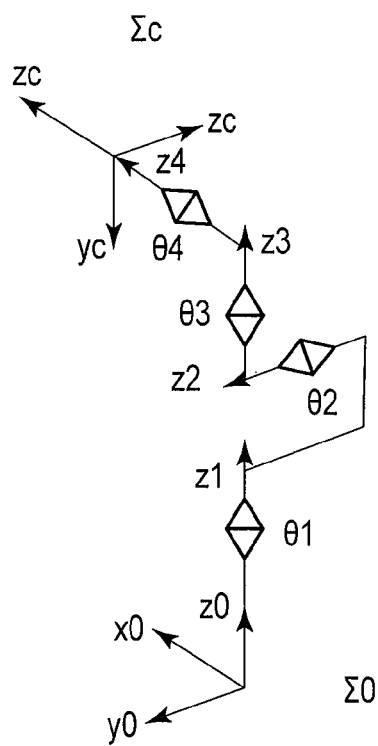
FIG. 3A is a view illustrating the rotation axes of first to third gimbals and movable bodies incorporated in the tracking apparatus of FIG. 1, assumed when a target position identifying unit is oriented horizontally.

Tracking apparatuses according to embodiments will be described in detail with reference to the accompanying drawings. In the embodiments, like reference numbers denote like elements, and duplicate description will be avoided.

The tracking apparatuses of the embodiments are those applied to a tracking system for tracking a moving object.

The embodiments has been developed in light of the above, and aims to provide a tracking apparatus that does not require a high angular velocity to automatically track a moving object over the entire sky.

According to one embodiment, a tracking apparatus comprising a spherical body, a first gimbal, a second gimbal, a third gimbal, a movable body, three or more spherical driving units, a hold unit, a target position identifying unit, a first angle sensor, a second angle sensor, a third angle sensor, a fourth angle sensor, a rotation spring driving unit, a moving unit, a transmission unit, and a control unit. The first gimbal is supported by the spherical body and rotates about a first gimbal axis. The second gimbal is supported by the first gimbal and rotates about a second gimbal axis perpendicular to the first gimbal axis. The third gimbal is supported by the second gimbal and rotates about a third gimbal axis perpendicular to the second gimbal axis at an intersection between the first gimbal axis and the second gimbal axis. The movable body is supported by the third gimbal and rotates about a fourth gimbal axis perpendicular to the third gimbal axis. The three or more spherical driving units are connected to the movable body and are kept in contact with portions of the spherical body to move the movable body in a desired direction. The hold unit connects the third gimbal to the movable body, and holds the spherical driving units pressed against the spherical body. The target position identifying unit is supported by the third gimbal and identifies a position of a target and outputs position data of the target. The first angle sensor detects a first rotation angle of the first gimbal relative to a bottom of the spherical body. The second angle sensor detects a second rotation angle of the second gimbal relative to the first gimbal. The third angle sensor detects a third rotation angle of the third gimbal relative to the second gimbal. The fourth angle sensor detects a fourth rotation angle of the movable body relative to the third gimbal. The rotation spring driving unit returns the third gimbal to a center of a rotation range of the third gimbal. The moving unit is supported by the third gimbal and moves a movable lens to set a distance between a fixed lens and the movable lens. The transmission unit transmits a driving force of the movable body to the moving unit and interrupts transmission of the driving force to the moving unit. The control unit causes the spherical driving units to swing the movable body based on the position data, the first rotation angle, the second rotation angle, the third rotation angle, and the fourth rotation angle, reorients the movable body to point in a desired direction, and controls the distance.

(First Embodiment)

Referring first to FIGS. 1 and 2A to 2D, a tracking apparatus according to a first embodiment will be described. FIG. 1 is a block diagram illustrating a tracking apparatus according to the first embodiment. FIG. 2A is a perspective view of the tracking apparatus of FIG. 1, taken when the apparatus is viewed in the direction indicated by vector (X, Y, Z)=(1, −1, 1), Z axis representing a direction toward the zenith. FIG. 2B is a front view of the tracking apparatus, taken when the apparatus is viewed in the negative Y direction. FIG. 2C is a side view of the tracking apparatus, taken when the apparatus is viewed in the negative X direction. FIG. 2D is a top plan view of the tracking apparatus, taken when the apparatus is viewed in the positive Z direction (i.e., viewed from above). In FIG. 2A, the X-, Y- and Z-axes are defined, and in FIGS. 2A to 2D, the directions associated with the X-, Y- and Z-axes are shown.

The moving object image tracking apparatus comprises first to third gimbals 111, 121 and 131, a movable body 141, a base 101, first to fourth angle sensors 112, 122, 132 and 142, a spherical body 150, wheels 151, 152 and 153, a drive hold unit 155, a target position identifying unit (camera sensor) 161, a controller 163, first to third wheel driving units 171, 172 and 173, a rotary spring driving unit 174, a fixed lens 181, a movable lens 182, a driving power transmission unit 183, and a linearly moving unit 184. The wheels and the corresponding wheel driving units will be collectively referred to as a spherical body driving unit.

In the first embodiment, the spherical body 150 contains the first to third gimbals 111, 121 and 131, the movable body 141, the base 101, the first to fourth angle sensors 112, 122, 132 and 142, the wheels 151, 152 and 153, the drive hold unit 155, the target position identifying unit 161, the controller 163, and the first to third wheel driving units 171, 172 and 173. The spherical body 150 is formed of a material that enables the target position identifying unit 161 to identify a target. For instance, the spherical body 150 is formed of a transparent material that can pass therethrough the light to be detected by the target position identifying unit 161.

The first gimbal 111 is supported by the base 101 provided at the bottom of the spherical body 150 so that it can rotate about a first rotation axis 110 which extends vertically and serves as a first gimbal axis. The second gimbal 121 is supported by the first gimbal 111 so that it can rotate about a second rotation axis 120 which is arranged perpendicular to the first rotation axis 110 and is horizontally rotatable. The third gimbal 131 is supported by the second gimbal 121 so that it can rotate about a third rotation axis 130 which is rotatable and perpendicular to the second rotation axis 120. In FIG. 1, the third rotation axis 130 is perpendicular to the surface of the drawing.

Further, a rotary spring driving mechanism 174 is provided in association with the third rotation axis 130. The spring driving mechanism 174 urges the third gimbal 131 to the center of rotation by its restoring force. For instance, when the third gimbal 131 slightly moves clockwise or counterclockwise about the third rotation axis 130, the spring driving mechanism 174 rotates the second gimbal 121 and the first gimbal 111 so as to return the third gimbal 131 to the center of rotation. The spring driving mechanism 174 may be coupled to, for example, the shaft of the third gimbal axis, or be incorporated in the third gimbal 131 or the drive hold unit 155. The spring driving mechanism 174 may be formed of, for example, elastic members (such as springs) as shown in FIG. 1 and may couple the third and second gimbals 131 and 121. Alternatively, the spring driving mechanism 174 may be an elastic pivot formed by attaching the third gimbal 131 to the third rotation axis 130.

The target position identifying unit 161 is used to output position data on a target is incorporated in the third gimbal 131. The target position identifying unit 161 is also called a target identifying sensor, and is, for example, a camera sensor. It identifies a target and obtains image data thereof. The third gimbal 131 also incorporates a variable optical system comprising the fixed lens 181, the movable lens 182, the driving force transmission unit 183 and the linearly moving unit 184. This optical system adjusts the focal distance corresponding to the relative distance between itself and the target to acquire received image light, and outputs the image light to the target identifying sensor. Since the target position identifying unit 161 (such as a camera), which is great in load, is provided at the center of rotation in the gimbal mechanism to be driven, the load inertia can be reduced.

The base 101 is coupled to the first gimbal 111 to support the first gimbal 111, the second gimbal 121, the third gimbal 131, the movable body 141, the drive hold unit 155, the fixed lens 181, the movable lens 182, the driving force transmission unit 183, the linearly moving unit 184, and the target position identifying unit 161, thereby serving as a table for placing the tracking apparatus thereon.

The movable body 141 is coupled to the third gimbal 131 via the drive hold unit 155. The movable body 141 is provided perpendicular to the third rotation axis 130, and can rotate about a movable axis 140 as a movably supported fourth rotation axis. The movable body 141 is provided with at least three spherical driving units for driving the body 141 itself. The spherical driving units restrict the movement of the third gimbal and the movable body. The spherical driving units comprise wheels (e.g., omni-wheels 151, 152 and 153) for moving the movable body 141 relative to the spherical body 150, and the wheel driving units 171, 172 and 173 for rotating the wheels. FIG. 1 and FIGS. 2A to 2D show an example case where three omni-wheels 151, 152 and 153 are arranged at regular circumferential intervals of 120 degrees. The "omni-wheel" is a collective term of a wheel (rotary body) that can not only rotate the spherical body as a wheel, but also move in a direction different from the direction of the rotation. The rotation axis of each omni-wheel is connected to the rotation axis of the corresponding wheel driving unit, and the wheel main body of each omni-wheel is rotated by the same.

The spherical driving units can rotate the movable body 141 in a desired direction relative to the spherical body 150. The spherical driving units may incorporate rotary springs for pressing the wheels against the spherical body. In the FIG. 1 example, when the spherical body 150 is placed such that the rotary springs of the spherical driving units are shifted from the equilibrium position, the omni-wheels are pressed against the inner surface of the spherical body 150 by the restoring forces of the rotary springs. If the omni-wheels are pressed against the spherical body 150 by appropriate forces with the rotary springs, the spherical driving units can transmit the driving forces of the first, second and third wheel driving units 171, 172 and 173, utilizing the frictional forces between the spherical body 150 and the omni-wheels. As a result, the movable body 141 can smoothly move on the spherical body 150. Since a driving method utilizing a spherical body is employed as a driving force generating method, the problem of gimbal lock can be avoided, whereby a high angular velocity is not required for one driving axis and hence the tracking apparatus can be made compact and light.

The movable body 141 is further provided with the driving force transmission unit 183 for transmitting the rotational force of the fourth rotation axis 140 to the linearly moving unit 184. The driving force transmission unit 183 comprises a clutch element for coupling and separating the movable body 141 and the linear moving unit 184 to transmit a driving force therebetween and interrupt the transmission of the driving force.

The drive hold unit 155 connects the third gimbal 131 to the movable body 141 not only to make the third gimbal 131 and the movable body 141 rotatable relative to each other, but also to keep the wheels of the spherical driving units pressed against the spherical body 150. This structure enables the movable body 141 to smoothly move along the inner surface of the spherical body 150. The drive hold unit 155 is provided with, for example, a compression spring, the restoring force of which upwardly urges the movable body 141 in the example of FIG. 1, thereby pressing the omni-wheels against the inner surface of the spherical body 150. Since the omni-wheels are thus pressed against the inner surface of the spherical body 150 with an optimal force by the spring of the drive hold unit 155, the spherical driving units can transfer the driving forces of the first to third wheel driving units 171, 172 and 173 to the spherical body 150, using the frictional force between the spherical body 150 and the omni-wheels 151, 152 and 153. Further, the drive hold unit 155 is, for example, a bearing or an encoder, through which the third gimbal 131 is coupled to the movable body 141.

The first, second, third and fourth rotation axes 110, 120, 130 and 140 are provided with first, second, third and fourth angle sensors 112, 122, 132 and 142, respectively. The first angle sensor 112 detects the rotation angle of the first gimbal 111 relative to the base 101. The second angle sensor 122 detects the rotation angle of the second gimbal 121 relative to the first gimbal 111. The third angle sensor 132 detects the rotation angle of the third gimbal 131 relative to the second gimbal 121. The fourth angle sensor 142 detects the rotation angle of the movable body 141 relative to the third gimbal 131. The fourth angle sensor 142 is, for example, an encoder.

The control unit 163 acquires data concerning the aforementioned four angles from the first, second, third and fourth angle sensors 112, 122, 132 and 142, respectively, thereby identifying the orientation of the target position identifying unit 161, and instructing the first, second and third wheel driving units 171, 172 and 173 to make, zero, the tracking error detection values acquired from the tracking error detecting unit 162 to drive the wheels 151, 152 and 153. In other words, the control unit 163 calculates virtual position data associated with the same coordinate system as that of the target position identifying unit 161, using the four angles, and controls the spherical driving units to make the virtual position data coincide with the position data output from the target position identifying unit 161. The target position identifying unit 161, such as a camera, is installed in the gimbal mechanism to be driven, and rotational transform is performed on the target position information acquired from the image obtained by the identifying unit 161, based on the relative angle between the third gimbal and the movable body (detected by the fourth angle sensor 142). As a result, the target position identifying unit 161 and the driving vector of the movable body can have the same coordinate system, thereby simplifying the image tracking control law. The control unit 163 performs rotational transform based on the rotational angle (θ4 recited below) of the movable body 141 relative to the third gimbal 131, thereby making the coordinate system of position data coincide with that of the vector indicating the swing motion of the movable body 141.

Figure 3B:
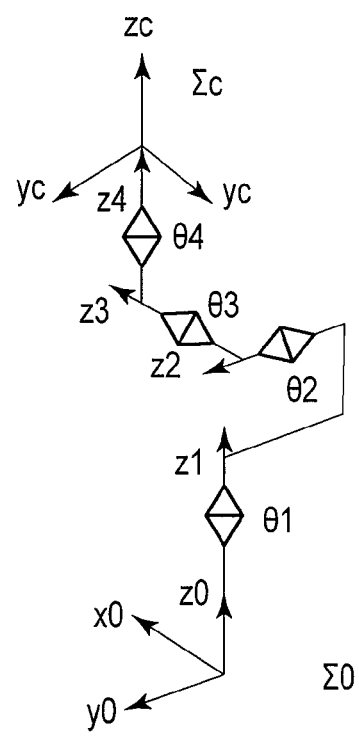
FIG. 3B is a view illustrating the rotation axes of the first to third gimbals and movable bodies incorporated in the tracking apparatus of FIG. 1, assumed when the target position identifying unit is oriented toward the zenith.

Referring then to FIGS. 3A and 3B, a rough description will be given of the first, second, third and fourth rotation axes 110, 120, 130 and 140 of the first, second, third and fourth gimbals 111, 121 and 131 and the movable body 141, which are set with respect to the spherical body 150. FIG. 3A shows a case where the target position identifying unit 161 is oriented horizontally, and FIG. 3B shows a case where the target position identifying unit 161 is oriented vertically (i.e., oriented toward the zenith). FIGS. 2A to 2D show a case where the movable body 141 is oriented upward, i.e., the target position identifying unit 161 is oriented toward the zenith.

With reference to the coordinate system Σ0 of the spherical body 150, the first, second, third and fourth rotation axes 110, 120, 130 and 140 of the first, second, third and fourth gimbals 111, 121 and 131 and the movable body 141 are set. The angle sensors are provided in association with these rotation axes. The first angle sensor 112 detects the rotation angle θ1 of the first gimbal 111 relative to the spherical body 150. The second angle sensor 122 detects the rotation angle θ2 of the second gimbal 121 relative to the first gimbal 111. The third angle sensor 132 detects the rotation angle θ3 of the third gimbal 131 relative to the second gimbal 121. The fourth angle sensor 142 detects the rotation angle θ4 of the movable body 141 relative to the third gimbal 131. Further, a rotary spring driving mechanism is provided in association with the third rotation axis 130. This mechanism has a restoring force for returning, to the center of the rotation range, the third gimbal 131 that can be externally rotated.

Figure 4:
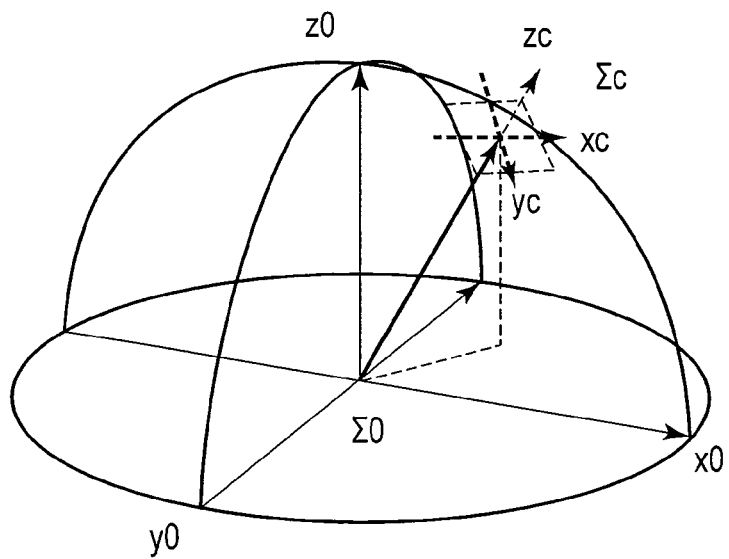
FIG. 4 is a schematic view illustrating the position of a movable body 141 relative to a spherical body 150.

Referring to FIG. 4, a description will be given of the position of the movable body 141 relative to the spherical body 150.

Since the rotation axes of the bodies have the same intersection, the movable body 141 is associated only in rotation transform with the coordinate system Σc of a camera that serves as the target position identifying unit 161 and is provided on the third gimbal 131. Accordingly, the movable body 141 is positioned on a spherical coordinate system associated with the spherical body 150.

Referring then to FIGS. 5A to 5D, the relationship between the spherical body 150, the omni-wheels and driving directional vectors will be described.

Figure 5A:
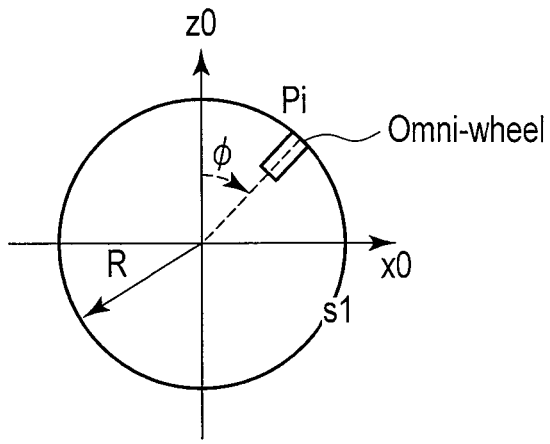
FIG. 5A is a schematic front view illustrating the position of a wheel.
Figure 5B:
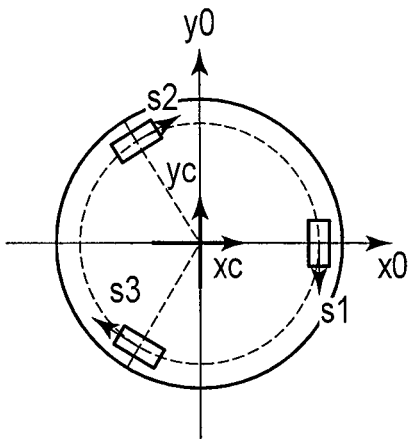
FIG. 5B is a schematic top plan view illustrating the driving-directional vector of each wheel.

FIG. 5A is a front view corresponding to FIG. 2B, and FIG. 5B is a top view corresponding to FIG. 2D. FIG. 5B shows a state in which the movable body 141 is oriented upward, and the coordinate system Σ0 of the spherical body 150 coincides with that Σc of the camera. A description will now be given of an instance where, for example, the spherical body 150 has a radius of R, and three omni-wheels i (i=1, 2 and 3) are attached to the spherical body at an attachment angle of φ with respect to the z0 axis extending toward the zenith, and arranged at regular circumferential intervals of 120 degrees. The coordinates $P_i$ (i=1, 2 and 3) of contacts between the spherical body 150 and each wheel i are given by $P_1 = [R \cdot \sin\phi \ 0 \ R \cdot \cos\phi]$ $P_2 = [-1/2 \cdot R \cdot \sin\phi \ \sqrt{3}/2 \cdot R \cdot \sin\phi \ R \cdot \cos\phi]$ $P_3 = [-1/2 \cdot R \cdot \sin\phi \ -\sqrt{3}/2 \cdot R \cdot \sin\phi \ R \cdot \cos\phi]$ [1]

Further, the driving-directional vector $s_i$ (i=1, 2 and 3) of each contact is given by $s_1 = [0 \ -1 \ 0]$ $s_2 = [\sqrt{3}/2 \ 1/2 \ 0]$ $s_3 2 = [-\sqrt{3}/2 \ 1/2 \ 0]$ [2]

Using these relationships, the relationship between the angular velocity $\omega_j$ (j=x, y, z) of the movable body 141 about the axes (x, y, z) of the camera coordinate system, and the circumferential velocity vsi (i=1, 2 and 3) of each wheel i is given by $$\begin{bmatrix} vs1 \\ vs2 \\ vs3 \end{bmatrix} = R \begin{bmatrix} \cos\phi & 0 & -\sin\phi \\ -\frac{1}{2}\cos\phi & +\frac{\sqrt{3}}{2}\cos\phi & -\sin\phi \\ -\frac{1}{2}\cos\phi & -\frac{\sqrt{3}}{2}\cos\phi & -\sin\phi \end{bmatrix} \begin{bmatrix} \omega_x \\ \omega_y \\ \omega_z \end{bmatrix} \quad [3]$$

From this equation, in a state in which the coordinate system Σ0 of the spherical body 150 coincides with that Σc of the camera, the rotational speed of the motor, used to detect the angular velocity of the movable body 141, can be determined.

For instance, to rotate the movable body 141 in the z-direction, angular velocity $\omega_z$ about the axis z is applied to the movable body 141. At this time, from the equation [3], vsi (i=1, 2 and 3) is given by $(vs1, vs2, vs3) = (-\sin\phi, -\sin\phi, -\sin\phi)$ In this case, the wheels are rotated so that vectors s1, s2 and s3 impart the same motor rotational velocity as shown in FIG. 5B.

Figure 5C:
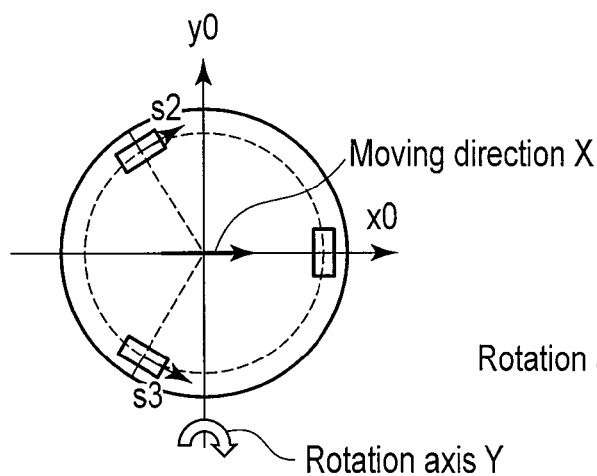
FIG. 5C is another top plan view illustrating a case where the movable body is intended to roll in the x-direction.

To rotate the movable body 141 in the x-direction, angular velocity $\omega_y$ about the axis y is applied to the movable body 141. At this time, from the equation [3], vsi (i=1, 2 and 3) is given by $(vs1, vs2, vs3) = (0, \sqrt{3}/2 \cos\phi, -\sqrt{3}/2 \cos\phi)$ In this case, the wheels are rotated so that vectors 2 and 3 impart opposite motor rotational velocities as shown in FIG. 5C.

Figure 5D:
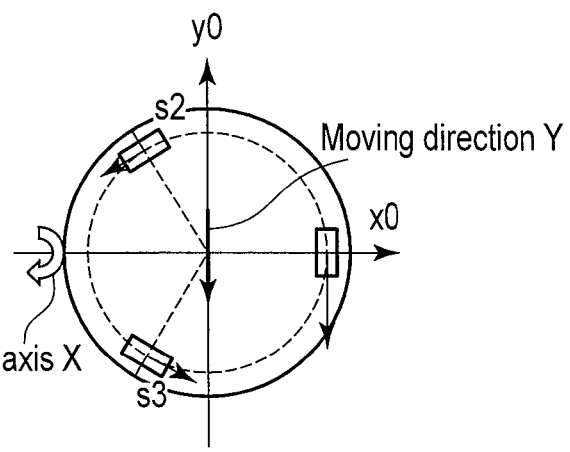
FIG. 5D is yet another top plan view illustrating a case where the movable body is intended to roll in the y-direction.

Further, to rotate the movable body 141 in the y-direction, angular velocity $\omega_x$ about the axis x is applied to the movable body 141. At this time, from the equation [3], vsi (i=1, 2 and 3) is given by $(vs1, vs2, vs3) = (\cos\phi, -1/2 \cos\phi, -1/2 \cos\phi)$ In this case, the wheels are rotated so that vectors s2 and s3 impart motor rotational velocities half in magnitude and opposite in direction with respect to vector s1, as is shown in FIG. 5D.

Referring then to FIGS. 6A to 6D, a description will be given of changes in the attitudes of the gimbals assumed when the movable body 141 is driven by the spherical driving units along the inner surface of the spherical body 150.

Figure 6A:
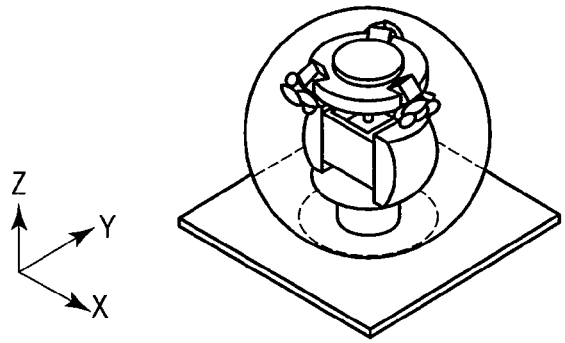
FIGS. 6A to 6D are perspective views useful in explaining a case where the movable body is moved from a state in which it is oriented upward, to a state in which it is moved in the depth direction, i.e., moved diagonally leftward, FIG. 6A showing an initial state of the movable body, FIG. 6B showing a state in which the movable body is moving diagonally leftward, FIG. 6C showing a state in which first and second gimbals are rotating in accordance with the diagonally leftward moving, FIG. 6D showing a state in which a third gimbal is returned to the center of rotation, and the first and second gimbals are rotating.
Figure 6B:
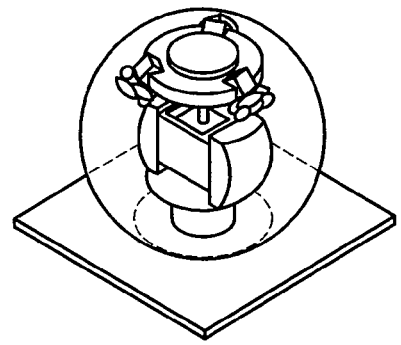
Figure 6C:
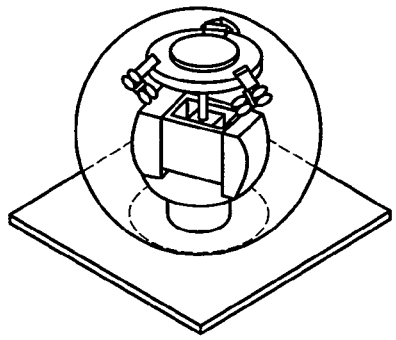
Figure 6D:
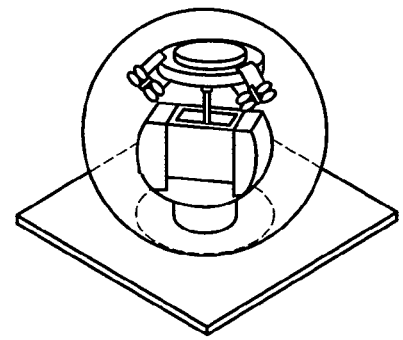

FIGS. 6A to 6D show a case where the movable body 141 shifts from an upward oriented state to a rearward oriented state, i.e., a diagonally leftward oriented state ((X, Y, Z)=(−1, 1, 0)). In these figures, the frontward direction is set as the negative Y direction, as in FIG. 2B. FIG. 6A shows an initial state where if the movable body 141 is oriented upward, the third gimbal 131 is also oriented upward. When the movable body 141 starts to be moved diagonally leftward by the operations of the spherical driving units, the first to third gimbals coupled to the movable body 141 are driven in accordance with the motion of the movable body 141, as is shown in FIG. 6B. At this time, the third gimbal 131 closest to the movable body 141 initially rotates. When the diagonally leftward motion of the movable body 141 advances as shown in FIG. 6C, the first and second gimbals also rotate about their respective axes. At this time, the rotation spring associated with the third rotation axis 130 is driven to produce a restoring force for returning the third rotation axis 130 to the center of its rotation range. This restoring force is distributed to the first and second gimbals 111 and 121 to rotate them. When the motion of the movable body 141 further advances as shown in FIG. 6D, a state is assumed in which the third gimbal 131 is returned to the center of the rotation range, and only the first and second gimbals 111 and 121 can rotate (in accordance with the motion of the movable body 141). As described above, the tracking apparatus of the first embodiment has a passive redundancy caused by driving the rotation spring in association with the third rotation axis 130. This feature enables the first to third gimbals to be driven by the motion of the movable body 141 even when the third gimbal 131 is oriented toward the zenith or its vicinity. By virtue of the gimbal mechanism that is driven by the swing motion of the movable body utilizing the spherical driving units, the orientation of the camera can be detected, thereby causing the target recognition sensor, such as the camera, to automatically follow a target that can move in all directions.

Figure 7:
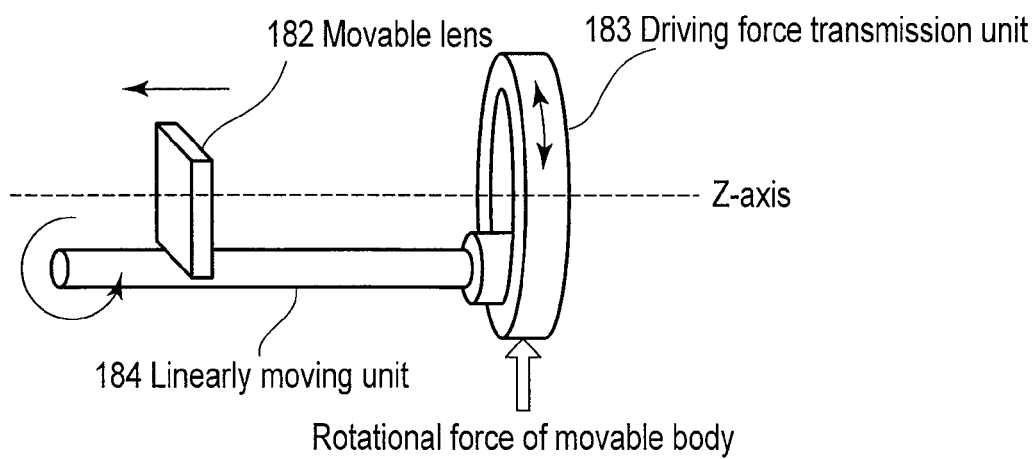
FIG. 7 is a view useful in explaining movement of a movable lens.

Referring then FIG. 7, a description will be given of the movement of the movable lens performed when the movable body 141 is driven on the inner surface of the spherical body 150 by the spherical driving units.

When the movable body 141 is rotated by the spherical driving units about the z-axis on the inner surface of the spherical body 150, the movable body 141 and the third gimbal 131 rotate relative to each other. The driving power transmission unit 183 is a clutch element, and performs transmission and interruption of driving power in accordance with coupling and separation of the movable body 141 and the linearly moving unit 184. As the clutch element, a contact type clutch is used, for instance. The driving power transmission unit 183 is a cylindrical member as shown in FIG. 7, and transmits driving power to the linearly moving unit 184 and interrupts the transmission of driving power thereto by enlarging and reducing its diameter.

When it is necessary to move the movable lens 182, the clutch is coupled to thereby transmit, to the linearly moving unit 184, the driving power generated by the swing motion of the movable body 141. If the clutch is thus in a transmission state, the driving power transmission unit 183 rotates in the directions indicated by the arrows shown in FIG. 7 in accordance with the rotation of the movable body 141. The linearly moving unit 184 is conversion means (such as a ball screw or a worm gear) for converting rotation into linear motion, and converts the rotation of the driving power transmission unit 183. The movable body 141 rotates the screw portion of the linearly moving unit 184 via the driving power transmission unit 183 to thereby linearly move the movable lens 182 coupled to the nut portion of the linearly moving unit 184. When the driving power transmission unit 183 rotates, the linearly moving unit 184 rotates as shown in FIG. 7, thereby moving the movable lens 182 on the linearly moving unit 184 along with the moving unit 184. For instance, if the driving power transmission unit 183 is rotated by the movable body 141 clockwise when viewed from the right-hand side in FIG. 7, the screw portion of the linearly moving unit 184 rotates accordingly to thereby move the movable lens 182 leftward in FIG. 7. In contrast, if the driving power transmission unit 183 is rotated counterclockwise when viewed from the right-hand side in FIG. 7, the screw portion of the linearly moving unit 184 rotates in the opposite direction to thereby move the movable lens 182 rightward in FIG. 7.

The linearly moving unit 184 with the movable lens 182 supported by the gimbal structure enables acquisition of an enlarged image of a target, and hence enables detailed information to be acquired from the target.

Figure 8:
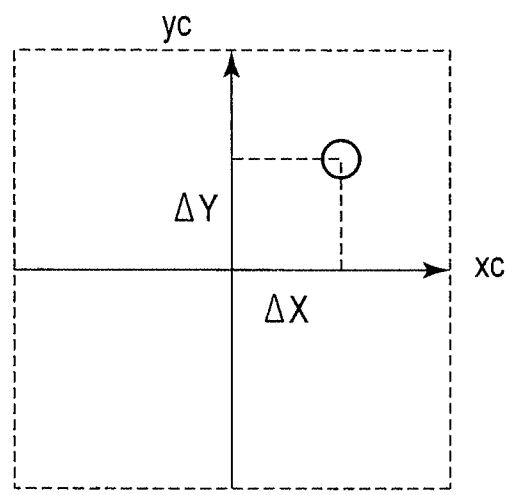
FIG. 8 is a view useful in explaining a tracking error between the viewing field of a camera and a moving object in the embodiment.

Referring to FIG. 8, the relationship between the viewing field of a camera image and a target will be described.

When a target is captured within the viewing field of a camera as the target position identifying unit 161 incorporated in the third gimbal 131, using the coordinate system Σc of the camera, tracking error detection values (ΔX, ΔY) as the amounts deviated from the center of the camera are acquired. In general, the tracking error detection values are acquired by calculating the center of gravity associated with a characterizing point obtained from image information.

Referring to FIG. 9, a tracking control system according to the first embodiment will be described. FIG. 9 is a block diagram illustrating the tracking control system for tracking a moving target.

When the movable body 141 is driven on the inner surface of the spherical body 150 by the spherical driving units, the first, second and third gimbals 111, 121 and 131 are also driven in accordance with the swing motion of the movable body 141. At this time, the target position identifying unit 161 in the third gimbal 131 is swung to acquire image data including a target, thereby acquiring tracking error detection values (ΔX, ΔY) as position data associated with the target. At this time, since the gimbals 111, 121 and 131 and the movable body 141 are provided with the first, second, third and fourth angle sensors 112, 122, 132 and 142, angle data (θ1, θ2, θ3 and θ4) indicating the attitude of the movable body 141 is obtained.

Based on the tracking error detection values and the angle data, the control unit 163 generates angular velocity instructions for driving the spherical driving units 151, 152, 153, 171, 172 and 173.

To control the movable body 141 so as to make the target position identifying unit 161 track a target, it is necessary to perform tracking only based on tracking control law for generating angular velocities that reduce tracking errors. Since the camera coordinate system and the coordinate system of the driving-directional vector are shifted relative to each other by a fourth angle θ4 as the relative angle between the third gimbal 131 and the movable body 141, the equation for transforming the tracking error detection values (ΔX, ΔY) of the camera coordinate system into corresponding values in the coordinate system of the driving-directional vector is as follows:

$$\begin{bmatrix} \Delta Xr \\ \Delta Yr \end{bmatrix} = \begin{bmatrix} \cos\theta_r & -\sin\theta_r \\ \sin\theta_r & \cos\theta_r \end{bmatrix} \begin{bmatrix} \Delta X \\ \Delta Y \end{bmatrix} \quad [4]$$

Assuming that the tracking error detection values (ΔXr, ΔYr) are inputs, and tracking gain $K_c$ as a tracking proportional gain is a constant, angular velocity instruction $\omega_{jr}$ (j=x, y, z) for the movable body 141 is given by $$\begin{bmatrix} \omega_{xr} \\ \omega_{yr} \\ \omega_{zr} \end{bmatrix} = \begin{bmatrix} K_c & 0 & 0 \\ 0 & K_c & 0 \\ 0 & 0 & 0 \end{bmatrix} \begin{bmatrix} \Delta Yr \\ \Delta Xr \\ 0 \end{bmatrix} \quad [5]$$

Further, it is necessary to reorient (swing) the movable body 141 to point in a desired direction where the target position identifying unit 161 does not catch a target. Assuming that the position vector of the target is (eT_x, eT_y, eT_z), the relationship between the position vector of the target (eT_x, eT_y, eT_z) and the angles ($\theta_{r1}, \theta_{r2}$) of the target on an easily designated spherical coordinate system is expressed by the following equations [6]:

$$\begin{cases} eT\_x = \cos\theta_{r2} \cdot \cos\theta_{r1} \\ eT\_y = \cos\theta_{r2} \cdot \sin\theta_{r1} \\ eT\_z = \sin\theta_{r2} \end{cases} \quad [6]$$

Since the tracking apparatus of the first embodiment comprises angle sensors corresponding to the gimbals, the orientation of the movable body 141 can be detected. Assume here that angle data corresponding to the first, second and third gimbals 111, 121 and 131 and the movable body 141 are set to $\theta 1$, $\theta 2$, $\theta 3$ and $\theta 4$, respectively. The position vector of the target in the coordinate system $\Sigma 0$ of the spherical body 150 is the sum of the visual axis vector from the origin of the coordinate system $\Sigma 0$ to the origin of the coordinate system $\Sigma c$ of the camera, and the virtual tracking error vector (dltX, dltY) of the target position in the virtual camera coordinate system $\Sigma c$ associated with the gimbals. The coordinate transform matrices $^0R_1$, $^1R_2$, $^2R_3$, $^3R_4$, $^4R_c$ corresponding to the rotation axes are expressed by the following equations [7]:

$$^0R_1 = \begin{bmatrix} \cos\theta 1 & -\sin\theta 1 & 0 \\ \sin\theta 1 & \cos\theta 1 & 0 \\ 0 & 0 & 1 \end{bmatrix} \quad [7]$$

$$^1R_2 = \begin{bmatrix} 1 & 0 & 0 \\ 0 & 0 & 1 \\ 0 & -1 & 0 \end{bmatrix} \begin{bmatrix} \cos\theta 2 & -\sin\theta 2 & 0 \\ \sin\theta 2 & \cos\theta 2 & 0 \\ 0 & 0 & 1 \end{bmatrix}$$

$$^2R_3 = \begin{bmatrix} 1 & 0 & 0 \\ 0 & 0 & -1 \\ 0 & 1 & 0 \end{bmatrix} \begin{bmatrix} \cos\theta 3 & -\sin\theta 3 & 0 \\ \sin\theta 3 & \cos\theta 3 & 0 \\ 0 & 0 & 1 \end{bmatrix}$$

$$^3R_4 = \begin{bmatrix} 1 & 0 & 0 \\ 0 & 0 & 1 \\ 0 & -1 & 0 \end{bmatrix} \begin{bmatrix} 0 & 0 & 1 \\ 0 & 1 & 0 \\ -1 & 0 & 0 \end{bmatrix}$$

$$^4R_c = \begin{bmatrix} \cos\theta 4 & -\sin\theta 4 & 0 \\ \sin\theta 4 & \cos\theta 4 & 0 \\ 0 & 0 & 1 \end{bmatrix}$$

The transform matrix from the coordinate system $\Sigma 0$ of the spherical body 150 to the camera coordinate system $\Sigma c$ is given by $$^0R_c = {}^0R_1 {}^1R_2 {}^2R_3 {}^3R_4 {}^4R_c \quad [8]$$

From the above relationships, the relationship between the inner product of the position vector of the target and the attitude of the tracking mechanism, and the position vector of the target is given by $$\begin{bmatrix} \text{dot\_eT\_eX} \\ \text{dot\_eT\_eY} \\ \text{dot\_eT\_eE} \end{bmatrix} = (^0R_c)^{-1} \begin{bmatrix} eT\_x \\ eT\_y \\ eT\_z \end{bmatrix} \quad [9]$$

where dot_eT_eX represents the inner product of the position vector eT of the target and the horizontal unit vector eX of the camera associated with the gimbals, dot_eT_eY represents the inner product of the position vector eT of the target and the vertical unit vector eY of the camera associated with the gimbals, and dot_eT_eE represents the inner product of the position vector eT of the target and the unit vector eE of the visual axis vector of the camera associated with the gimbals. Further, |eT|=|eE|=1.

Accordingly, the virtual tracking error values (dltX, dltY) of the target position in the virtual camera coordinate system $\Sigma c$ associated with the gimbals are given by dltX=dot_eT_eX/dot_eT_eE dltY=dot_eT_eY/dot_eT_eE [10]

By substituting the virtual tracking error values (dltX, dltY) for the inputs ($\Delta X$, $\Delta Y$) of the equation [4] to thereby apply the angular velocity generation law expressed by the equation [4], orientation toward the position of the target can be realized. Since the orientation of the camera and the attitude of the movable body can be detected by the driven gimbal mechanism, the camera can be reoriented to point in a desired direction by calculating a virtual tracking error associated with the camera in the third gimbal, with respect to a target position vector of an arbitrary direction.

Further, to drive the movable lens 182, it is necessary to rotate the movable body about the third gimbal 131. For instance, if the amount of movement of the nut portion of the linearly moving unit 184 per one revolution of the ball screw portion of the unit 184 is known in advance, an angular velocity instruction $\omega_z$ for providing a rotational amount $\theta z$ for the ball screw portion can be given.

In the first embodiment, a movable body with a rotational degree of freedom is provided at the tip of the triaxial gimbal structure, angle sensors are provided for the axes with respective rotational degrees of freedom, the AZ and EL axes are set as driven elements, a rotary spring is provided only on the CE axis, a camera, a movable lens and a lens driving mechanism are provided on the CE axis, the movable body has a clutch and an outer gear, and a motor is provided for the movable body. By virtue of this structure, in the tracking apparatus of the first embodiment, the camera can be controlled to perform a zoom operation by lens driving, and perform tilt and pan operations, with the movable body kept rolling on the spherical body.

Figure 10:
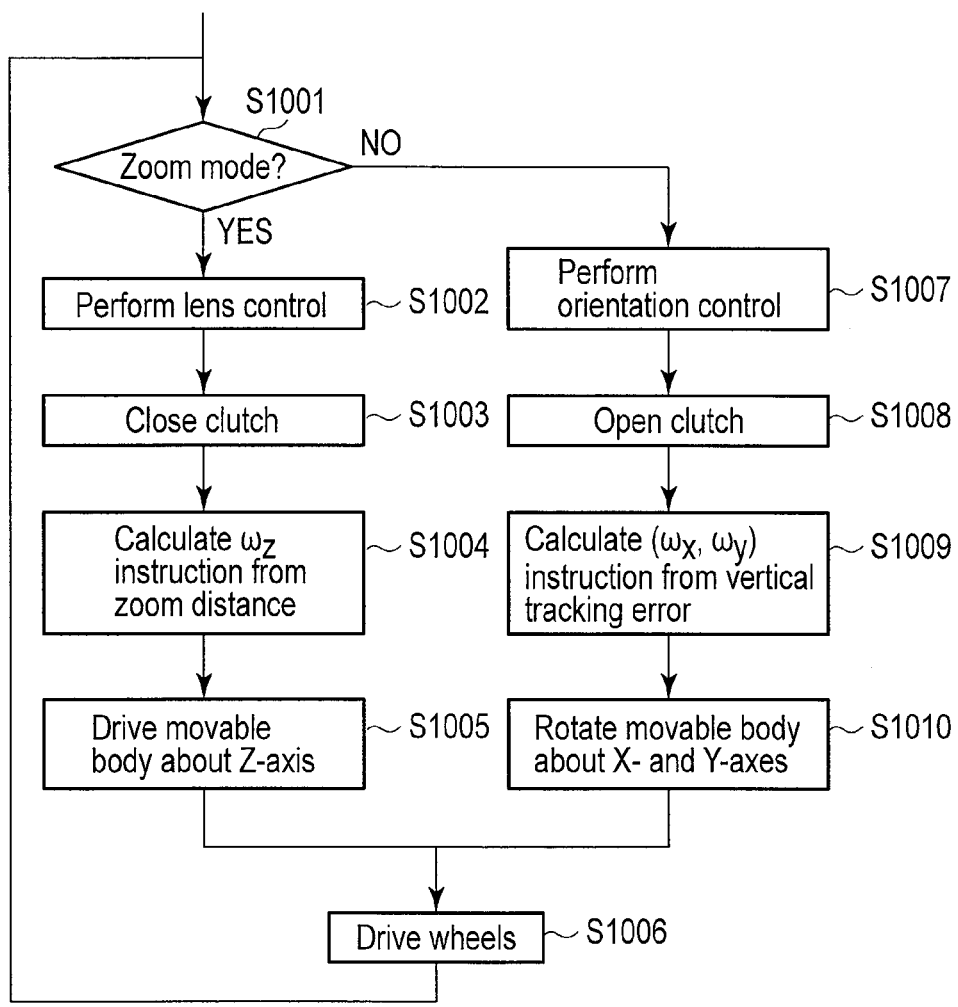
FIG. 10 is a flowchart illustrating an operation example associated with switching between orientation control, and lens control by driving a movable lens.

Referring then to FIG. 10, a description will be given of switching between orientation control for tracking a moving target or reorienting the camera to point in a desired direction, and lens control performed by driving the movable lens. FIG. 10 is a flowchart useful in explaining the switching between the orientation control and the lens control.

The tracking apparatus of the first embodiment comprises the driving power transmission unit 183, which enables the orientation control and the lens control to be performed independently. If the lens control, i.e., zoom operation, is necessary (step S1002), the clutch formed of the driving power transmission unit 183 is closed (step S1003). At this time, an angular velocity instruction $\omega_z$ corresponding to a zoom distance is calculated, thereby rotating the movable body 141 about the Z-axis to thereby drive the linearly moving unit 184. Further, if orientation control for tracking a target or reorienting the camera to point in a desired direction is needed, the clutch is opened. After that, angular velocity instructions $\omega_x$ and $\omega_y$ are calculated based on the tracking error sent from the target position identifying unit 161, and the virtual tracking error corresponding to an arbitrary target, thereby rotating the movable body 141 about the respective axes to move the axis of vision (step S1010).

As described above, in the first embodiment, since a target is tracked by a spherical body, the problem of gimbal lock can be avoided, with the result that high angular velocity is not required for each driving axis, and hence the entire apparatus can be reduced in size and weight. Further, since a heavy load, such as a camera, is provided at the center of rotation in the gimbal mechanism to be driven, the load inertia can be reduced.

Furthermore, the orientation of such a target identification sensor as a camera can be detected by the gimbal mechanism to be driven by swinging the movable body using the omniwheels, whereby the target identification sensor can be controlled to automatically track a target that moves in all directions.

In addition, since the target identification sensor (the camera) is provided within the gimbal mechanism to be driven, and the target position information obtained from an image sent from the target identification sensor is subjected to rotational transform based on the relative angle between the third gimbal and the movable body, whereby the position information and the driving vector of the movable body are set in the same coordinate system to thereby simplify the image tracking control law.

Also, since the orientation of the camera and the attitude of the movable body can be detected by the gimbal mechanism to be driven, the camera can be reoriented to point in a desired direction by calculating a virtual tracking error associated with the camera in the third gimbal, with respect to a target position vector of a desired direction.

Yet further, since the movable lens linearly moving unit 184 supported by the gimbal mechanism is provided, an enlarged image of a target can be acquired and hence detailed information can be obtained from the target.

(Second Embodiment)

A tracking apparatus according to a second embodiment differs from that of the first embodiment in that in the former, the position of the movable lens is measured by a ranging sensor, and orientation control of the tracking apparatus and the lens control are simultaneously performed.

Figure 11:
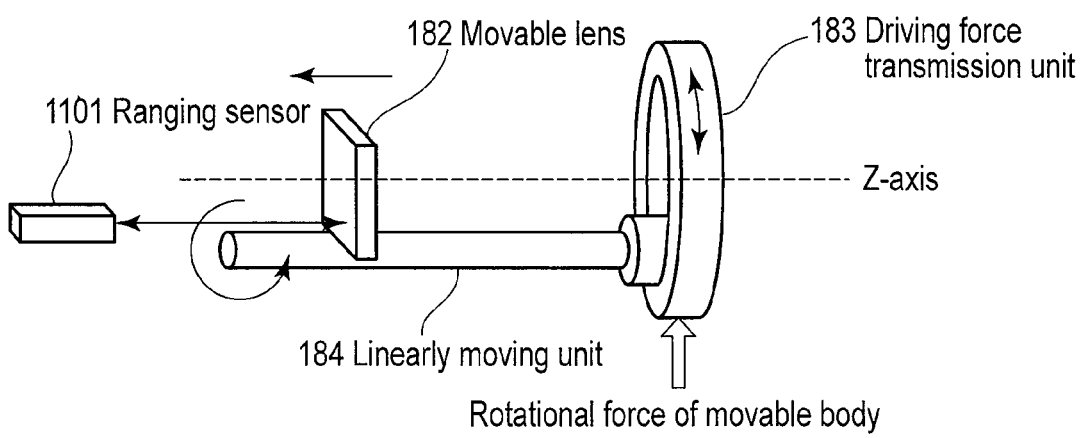
FIG. 11 is a view useful in explaining control of the movable lens performed when a ranging sensor is employed.

Referring to FIG. 11, the tracking apparatus of the second embodiment will be described. FIG. 11 is a view useful in explaining that the movable lens is moved when the movable body 141 rotates, and the ranging sensor measures the position of the movable lens.

The driving power transmission unit 183 is a gear element that always couples the movable body 141 to the linearly moving unit 184 to transmit a driving force. The linearly moving unit 184 is conversion means for converting the rotation of, for example, a ball screw into linear motion. The linearly moving unit 184 rotates the screw portion via the driving power transmission unit 183 to linearly move the movable lens coupled to the nut portion. Since thus, the linearly moving unit 184 moves in accordance with the rotation of the movable body 141 about the Z-axis, it is desirable to use, as the linearly moving unit 184, an element that moves by a great distance per unit of rotation.

A ranging sensor 1101 is provided in the third gimbal 131 for measuring, for example, the distance between the fixed lens and the movable lens 182 as position h. The movable lens 182 is provided in a lens barrel, and the ranging sensor 1101 detects the position of the movable lens in the lens barrel. The error between the measured movable lens position and a target lens position hr is given by the following equation:

$$\Delta H = hr - h$$

In order to control the movable body 141 to enable the target position identifying unit 161 to track a target, and to perform positioning control for adjusting the movable lens 182 to the target position, it is necessary to perform tracking using only a tracking control law for generating angular velocities that can minimize the tracking error and the position error of the movable lens 182. Assuming that tracking gains $K_c$ and $K_{c2}$ as tracking proportional gains are constants, an angular velocity instruction $\phi_{jr}$ (j=x, y, z) for the movable body 141, which simultaneously realizes the above two controls, is given by the following equation, based on the equation [4] used when only tracking is performed:

$$\begin{bmatrix} \omega_{xr} \\ \omega_{yr} \\ \omega_{zr} \end{bmatrix} = \begin{bmatrix} K_c & 0 & 0 \\ 0 & K_c & 0 \\ 0 & 0 & K_{c2} \end{bmatrix} \begin{bmatrix} \Delta Yr \\ \Delta Xr \\ \Delta H \end{bmatrix}$$

The above-described second embodiment can provide the same advantages as those of the first embodiment. Further, in the second embodiment, since lens control and orientation control can simultaneously be performed, an image of a target obtained by the camera can be enlarged to thereby acquire detailed information therefrom, while tracking the target.

In the above-described embodiments, since a target is tracked using the spherical body, the problem of gimbal lock can be avoided, and no high angular velocity is needed for each driving axis, with the result that the tracking apparatus can be made compact and light. In addition, since a heavy load, such as the camera, is provided at the center of rotation within the gimbal mechanism to be driven, the load inertia can be minimized, whereby the tracking apparatus does not require a high angular velocity to thereby enable automatic tracking of a target all over the sky.

The embodiments are not limited to the above-described embodiments, but the structural elements can be modified in various ways without departing from the scope. For instance, it can be easily conceived that the embodiment is not limited to the triaxial gimbal structure, but a structure with redundancy, in which the movable body is coupled to a biaxial gimbal structure by means of an elastic member, is possible. It can also be easily conceived that the embodiment is not limited to the structure in which the spherical driving units comprise rotary springs for pressing the wheels against the spherical body, but can be easily modified such that an urging mechanism for urging the wheels against the spherical body is provided between the third gimbal and the movable body. It can also be easily conceived that the linearly moving mechanism is not limited to the ball screw structure, but can be modified to, for example, a cylindrical rotary body with an inclined groove. In addition, various embodiments can be realized by appropriately combining the structural elements disclosed in the embodiments. For instance, some of the disclosed structural elements may be deleted. Some structural elements of different embodiments may be combined appropriately.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tracking apparatus comprising:
a spherical body;
a first gimbal supported by the spherical body and configured to rotate about a first gimbal axis;

a second gimbal supported by the first gimbal and configured to rotate about a second gimbal axis perpendicular to the first gimbal axis;

a third gimbal supported by the second gimbal and configured to rotate about a third gimbal axis perpendicular to the second gimbal axis at an intersection between the first gimbal axis and the second gimbal axis;

a movable body supported by the third gimbal and configured to rotate about a fourth gimbal axis perpendicular to the third gimbal axis;

three or more spherical driving units connected to the movable body and kept in contact with portions of the spherical body to move the movable body in a desired direction;

a hold unit connecting the third gimbal to the movable body, and holding the spherical driving units pressed against the spherical body;

a target position identifying unit supported by the third gimbal and configured to identify a position of a target and output position data of the target;

a first angle sensor configured to detect a first rotation angle of the first gimbal relative to a bottom of the spherical body;

a second angle sensor configured to detect a second rotation angle of the second gimbal relative to the first gimbal;

a third angle sensor configured to detect a third rotation angle of the third gimbal relative to the second gimbal;

a fourth angle sensor configured to detect a fourth rotation angle of the movable body relative to the third gimbal;

a rotation spring driving unit configured to return the third gimbal to a center of a rotation range of the third gimbal;

a moving unit supported by the third gimbal and configured to move a movable lens to set a distance between a fixed lens and the movable lens;

a transmission unit configured to transmit a driving force of the movable body to the moving unit and to interrupt transmission of the driving force to the moving unit; and a control unit configured to cause the spherical driving units to swing the movable body based on the position data, the first rotation angle, the second rotation angle, the third rotation angle, and the fourth rotation angle, to reorient the movable body to point in a desired direction, and to control the distance.

2. The apparatus according to claim 1, wherein the movable lens and the fixed lens are supported by the third gimbal, and the target position identifying unit identifies the target through the movable lens and the fixed lens.

3. The apparatus according to claim 1, wherein
the moving unit comprises a ranging sensor configured to detect a position of the movable lens and acquire ranging data including the position of the movable lens; and
the control unit controls the movable lens and the movable body to have a desired orientation, based on the ranging data, a tracking error and the first rotation angle, the second rotation angle, the third rotation angle, and the fourth rotation angle.

4. The apparatus according to claim 1, wherein the control unit performs rotation transform based on the fourth angle to make a coordinate system of the position data coincide with a coordinate system of a vector indicating a direction of a swing motion of the movable body.

5. The apparatus according to claim 1, wherein the control unit calculates, using the first rotation angle, the second rotation angle, the third rotation angle, and the fourth rotation angle, virtual position data associated with a coordinate system that coincides with a coordinate system of the target position identifying unit, and to control the movable body to have a desired orientation.

6. The apparatus according to claim 1, wherein the moving unit moves the movable lens using a worm gear.

7. The apparatus according to claim 1, wherein each of the spherical driving units comprises a wheel which is movable in a direction different from a direction of rotation thereof, and a wheel driving unit configured to rotate the wheel to move the movable body on the spherical body.

8. The apparatus according to claim 1, wherein the spherical driving units comprise rotary wheels, and springs which press the wheels against the spherical body.

* * * * *